US007165220B1

(12) United States Patent
Bates et al.

(10) Patent No.: US 7,165,220 B1
(45) Date of Patent: Jan. 16, 2007

(54) APPARATUS AND METHOD FOR PROCESSING BOOKMARK EVENTS FOR A WEB PAGE

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 09/563,271

(22) Filed: May 3, 2000

(51) Int. Cl.
*G06F 9/00* (2006.01)
(52) U.S. Cl. ............... 715/738; 715/739; 715/745; 715/772; 715/804; 715/810
(58) Field of Classification Search ............ 345/738, 345/739, 745, 772, 764, 776, 804, 805, 810; 707/501.1, 10, 104.1; 709/203, 245, 217, 709/219
See application file for complete search history.

(56) References Cited

U.S. PATENT DOCUMENTS

| 5,963,964 | A | * | 10/1999 | Nielsen | ............... | 707/501.1 |
| 6,041,360 | A | * | 3/2000 | Himmel et al. | ............ | 709/245 |
| 6,334,145 | B1 | * | 12/2001 | Adams et al. | ............. | 709/217 |
| 6,460,038 | B1 | * | 10/2002 | Kham et al. | ............... | 707/10 |

FOREIGN PATENT DOCUMENTS

| JP | 10-198614 | 7/1998 |
| JP | 10-307845 | 11/1998 |
| JP | 11-242677 | 9/1999 |
| JP | 11-259496 | 9/1999 |
| JP | 2000-020536 | 1/2000 |
| JP | 2000-035913 | 2/2000 |
| JP | 2000-089875 | 3/2000 |

OTHER PUBLICATIONS

Laura Lemay et al., "Web Work Shop Series, Java Script 1.1 Programming Introduction," Prentice Hall Publishing Co., pp. 82-84, 1996.
Aaron Skonnard et al., "Microsoft Internet Developer 2000," Mar., No. 18, ASCII Publishing Co., pp. 94-96.

* cited by examiner

*Primary Examiner*—Kristine Kincaid
*Assistant Examiner*—Peng Ke
(74) *Attorney, Agent, or Firm*—Martin & Associates, LLC; Derek P. Martin

(57) ABSTRACT

An apparatus and method define one or more events that run a Java script when a web page is bookmarked. In the preferred embodiments, a browser determines whether a requested web page was requested from a bookmark, whether the requested page is currently bookmarked, and whether the requested page is the browser's home page. This information is sent along with the page request so the web server can take appropriate action based on this information. One or more events are defined that each run a corresponding Java script to indicate when a page was loaded from a bookmark, when a page is bookmarked, when a page is not bookmarked, and when a page is the home page of the browser. The preferred embodiments allow bookmark information to be communicated to a web server, which can then use the bookmark information in a variety of ways. One preferable way to use the bookmark information is to vary the presentation of the web page depending on whether the page is bookmarked or not.

24 Claims, 8 Drawing Sheets

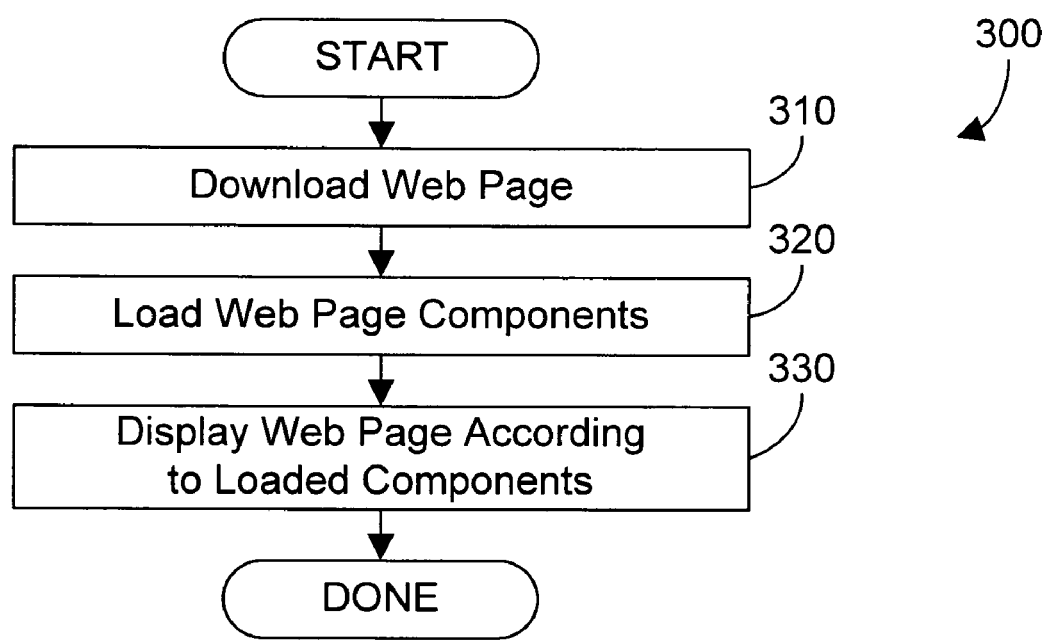
PRIOR ART FIG. 3

Web Page Source Code (HTML)

```
<!doctype html public "-//IETF//DTD HTML//EN">
<HTML>
<HEAD onBookmark="MM_onBookmark()">  —— 410
<script language="JavaScript">
<!--
url = new Array;
url[0]="http://www.ibm.com/promotions/promo.html";
                                            ——— 420
function MM_onBookmark() {
            // opens up a window with a special offer
            // this routine is only run if the page is bookmarked
            remote = window.open("","promowin","width=250,height=250);
            remote.location.href = url[0];
            if (remote.opener == null) {
                      remote.opener = window;
            }
            remote.opener.name = "opener";
}
//-->
</script>

<TITLE>IBM Corporation</TITLE>
<META NAME="keywords" CONTENT=ibm, international business machines,
internet, e-business, ebusiness, personal computer, personal system, e-commerce,
ecommerce, pc, workstation, mainframe, unix, technical support, homepage, home
page">
<META NAME="alias" CONTENT="http://www.ibm.com/">
<META NAME="owner" CONTENT="webmaster@www.ibm.com>
<META NAME="description" CONTENT="The IBM corporate home page, entry point
to information">
</HEAD>
<BODY>                            ——— 430
This could be the IBM home page
</BODY>
</HTML>
```

FIG. 4

Sample Bookmark Events

OnLoadFromBookmark
IsBookmarked
IsNotBookmarked
IsHomePage

FIG. 5

APPARATUS AND METHOD FOR PROCESSING BOOKMARK EVENTS FOR A WEB PAGE

BACKGROUND OF THE INVENTION

1. Technical Field

This invention generally relates to computer systems and more specifically relates to an apparatus and method for detecting when a web page is bookmarked and taking appropriate action based on the bookmark information.

2. Background Art

Since the dawn of the computer era, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Many modern computer systems are a complex combination of different hardware and software that are interconnected on a network. One network that has gained in importance and popularity in recent years is the Internet. A user typically accesses information on the Internet using a web browser that receives information in Hypertext Markup Language (HTML). HTML is typically organized into "pages" of information, with various "elements" making up components on each page. When a user accesses a web page using a browser, a server computer system locates the HTML elements that make up the page and serves up the page to the requesting web browser.

A common feature in known web browsers is the capability of marking a page so the page can be easily retrieved in the future. In Netscape Navigator, this type of mark is known as a "bookmark", and pages that are so marked are said to be "bookmarked". In Microsoft Internet Explorer, a page may be added to a list of "favorites" for later retrieval. Regardless of the specific label, the ability of placing a web page on a list for later retrieval greatly enhances the convenience of using a web browser. For the purpose of convenience in explaining the present invention, the term "bookmark" is used to indicate that the user has taken action to retrieve the web page from a list at a later time, and such a page is said to be "bookmarked". Other equivalent terms known in the art or developed in the future are expressly within the scope of the discussion herein.

Currently, code in a web page can be written in a script that is executed upon the occurrence of a specific event. One specific type of script is known as Java script, and known events include onPageLoad and onMouseOver. The onPageLoad event causes a Java script to be executed when a page is loaded. The onMouseOver event causes a Java script to be executed with the mouse (or pointer) is located in predefined areas of the web page. While these events are useful, there are currently no events that allow a web server to determine when a page is bookmarked. This information could be very valuable in advertising and in changing the presentation of a page based on whether the page was bookmarked or not. Without an apparatus and method for signaling when a page is bookmarked, the computer industry will not be able to distinguish between bookmarked pages and non-bookmarked pages, and will thus be forced to treat users with bookmarked pages the same as users who have not bookmarked a page.

DISCLOSURE OF INVENTION

According to the preferred embodiments, an apparatus and method define one or more events that run a Java script when a page is bookmarked. In the preferred embodiments, a browser determines whether a requested web page was requested from a bookmark, whether the requested page is currently bookmarked, and whether the requested page is the browser's home page. This information is sent along with the page request so the web server can take appropriate action based on this information. One or more events are defined that each run a corresponding Java script to indicate when a page was loaded from a bookmark, when a page is bookmarked, when a page is not bookmarked, and when a page is the home page of the browser. The preferred embodiments allow bookmark information to be communicated to a web server, which can then use the bookmark information in a variety of ways. One preferable way to use the bookmark information is to vary the presentation of the web page depending on whether the page is bookmarked or not.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 3 is a flow diagram of a prior art method for displaying a web page on a web browser;

FIG. 4 is a diagram of a sample HTML page for illustrating the concepts of the preferred embodiments;

FIG. 5 is a list showing four sample bookmark events;

BEST MODE FOR CARRYING OUT THE INVENTION

The method and apparatus of the present invention has particular applicability to the presentation of web pages on the Internet. For those individuals who are not familiar with the Internet, a brief overview of relevant Internet concepts is presented here.

1. OVERVIEW

Internet Communications

Figure 2:
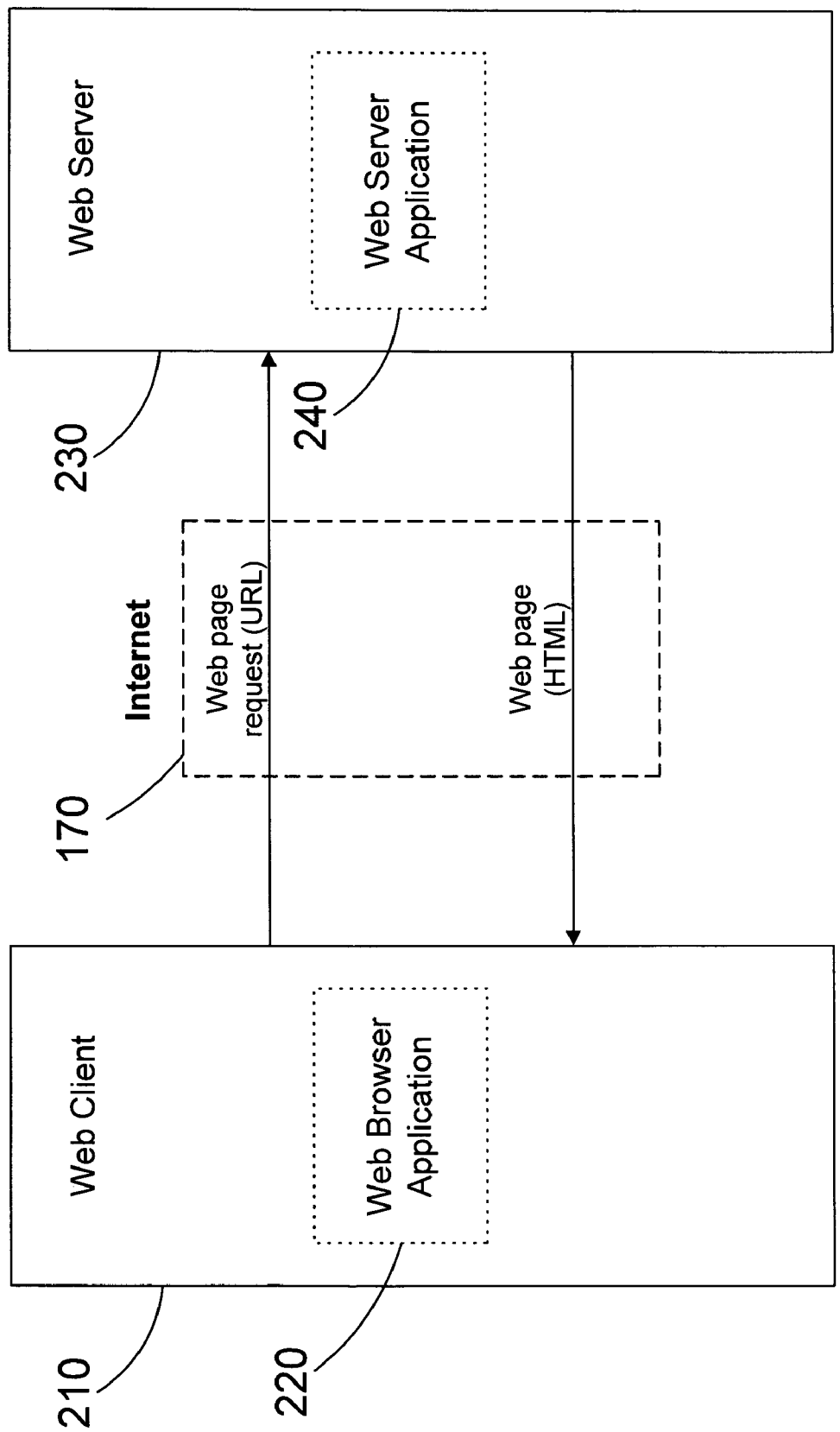
FIG. 2 is a block diagram showing how a web page is accessed in accordance with the prior art.

An example of a typical Internet connection is shown in FIG. 2. A user that wishes to access information on the Internet 170 typically has a computer workstation 210 known as a web client that executes an application program known as a web browser 220. Under the control of web browser 220, workstation 210 sends a request for a web page over the Internet 170. Web page data can be in the form of text, graphics and other forms of information, collectively known as MIME data. Each web server on the Internet has a known address, termed the Uniform Resource Locator (URL), which the web browser uses to connect to the appropriate web server. Because web server 230 can contain more than one web page, the user will also specify in the address which particular web page he wants to view on web server 230. A web server computer system 230 executes a web server application 240, monitors requests, and services requests for which it has responsibility. When a request specifies web server 230, web server application 240 generally accesses a web page corresponding to the specific request, and transmits (or "serves up") the page to the user's workstation 210.

Web Pages

A web page may contain various types of MIME data. Most web pages include visual data that is intended to be displayed on the monitor of user workstation 210. Web pages are generally written in Hypertext Markup Language (HTML). When web server 230 receives a web page request, a prior art method 300 as shown in FIG. 3 is typically used to display the requested web page to a user. Method 300 begins by downloading the web page in HTML form across the Internet 170 to the requesting web browser 220 (step 310). As discussed above, each web page typically includes a collection of separate "components". The HTML code of the downloaded web page typically contains references to components that must be separately loaded. These components are then loaded (step 320), and the web browser 220 outputs the web page and its components to user workstation 210 (step 330). Note that in addition to MIME data, a web page may also contain links that reference addresses of other web pages. The user can invoke these other web pages by clicking on these links using a mouse or other pointing device. This entire system of web pages with links to other web pages on other servers across the world is known as the "World Wide Web".

2. DETAILED DESCRIPTION

The present invention relates to performing one or more predefined functions when a web page is bookmarked in a web browser, and loading web pages based on information regarding whether the requested web page was bookmarked, requested from a bookmark, or the home page of the browser. In the preferred embodiments, the predefined functions include notifying the web server that served up the current web page that the page was bookmarked. The web server can then take appropriate action based on the knowledge that the page was bookmarked.

Figure 1:
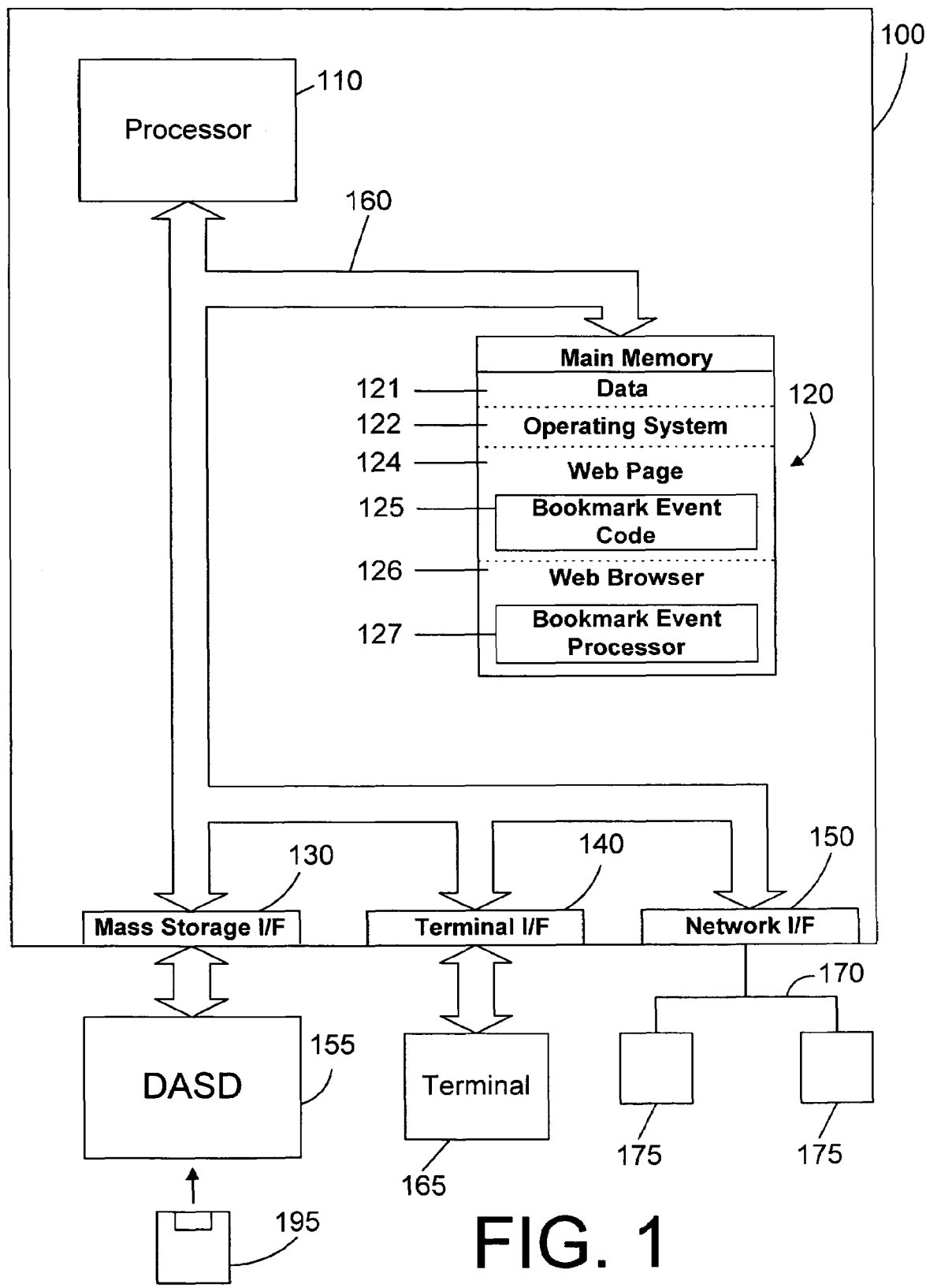
FIG. 1 is a block diagram of an apparatus in accordance with the preferred embodiments of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, one or more web pages 124, and a web browser 126. Web page 124 includes bookmark event code 125 that is executed upon the occurrence of a bookmark event. Web browser 127 includes a bookmark event processor 127 that executes the bookmark event code 125 in the web page upon the occurrence of a bookmark event. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, web page 124 and web browser 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

Web page 124 is representative of any information that may be displayed or presented by a web browser, including without limitation text, graphics, audio, video, animation, or other suitable information. Bookmark event code 125 suitably comprises a Java script that is executed upon the occurrence of a bookmark event. Note that a single Java script could be provided for all bookmark events, and processing of the event could be performed according to parameters passed when the Java script is invoked. In the preferred embodiments, there is a separate Java script for each bookmark event, and the occurrence of each event will thus cause its respective Java script to be executed.

Web browser 126 is any suitable web browser application for displaying web pages. Examples of known web browsers include Netscape Navigator and Microsoft Internet Explorer. Web browser 126 differs from known web browsers by having a bookmark event processor 127 that processes bookmark flags for a currently-requested page, that executes bookmark event code 125 when a corresponding bookmark event occurs, and that communicates status information regarding the bookmark flags to a web server. As a result of the status information regarding bookmark flags, a web server may serve up a page differently if it is bookmarked compared to when it is not bookmarked.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol, and the Internet is an example of a suitable network 170.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Referring now to FIG. 4, source code for a sample HTML page illustrates how a bookmark event may be implemented in accordance with the preferred embodiments. An event onBookmark may be specified in the header portion of an HTML page, as shown at 410 in FIG. 4. The onBookmark event includes the specification of an executable routine "MM_onBookmark" that is to be run when the page is bookmarked. In this example, the code "MM_onBookmark" is JavaScript code defined at 420 in the HTML page. When this code is executed, a special window opens up with a special offer if the page has been bookmarked. If the page has not been bookmarked, the special offer is not displayed. The special offer is located at url[0], which is defined in the web page to correspond to http://www.ibm.com/promotions/promo.html.

The HTML source code for the sample web page in FIG. 4 also includes meta tags as is known in the art, and a body that could include any suitable HTML data. The body for the sample web page in FIG. 4 includes the text "This could be the IBM home page" as shown at 430, but this is shown by way of example to indicate that any suitable MIME data may be included in the body of the current page.

FIG. 5 shows a list of sample bookmark events that are within the scope of the present invention. The onLoadFromBookmark event occurs when a page is loaded from a list of bookmarks in a browser. The isBookmarked event occurs when a page is loaded that is bookmarked, regardless of how the page was loaded. In other words, if a user navigates through a series of links to a page that so happens to be bookmarked, the isBookmarked event would occur upon loading the bookmarked page. Note that the isBookmarked event may also occur when the onLoadFromBookmark event occurs. The isNotBookmarked event occurs when a page is loaded that is not bookmarked. The isHomePage event occurs when a page is loaded that is the "home page" for the web browser. The home page in a browser is a special type of bookmark that determines which web page is loaded when the browser is first invoked. The home page for a browser does not show up in the bookmark list, but is typically shown in a setup or preferences menu, where the user can enter a URL of a web page that the browser should invoke when the browser is executed. This isHomePage event illustrates that the concepts of the preferred embodiments are not limited to known bookmark lists, but may be applied to other mechanisms for specially designating web pages as well.

Figure 6:
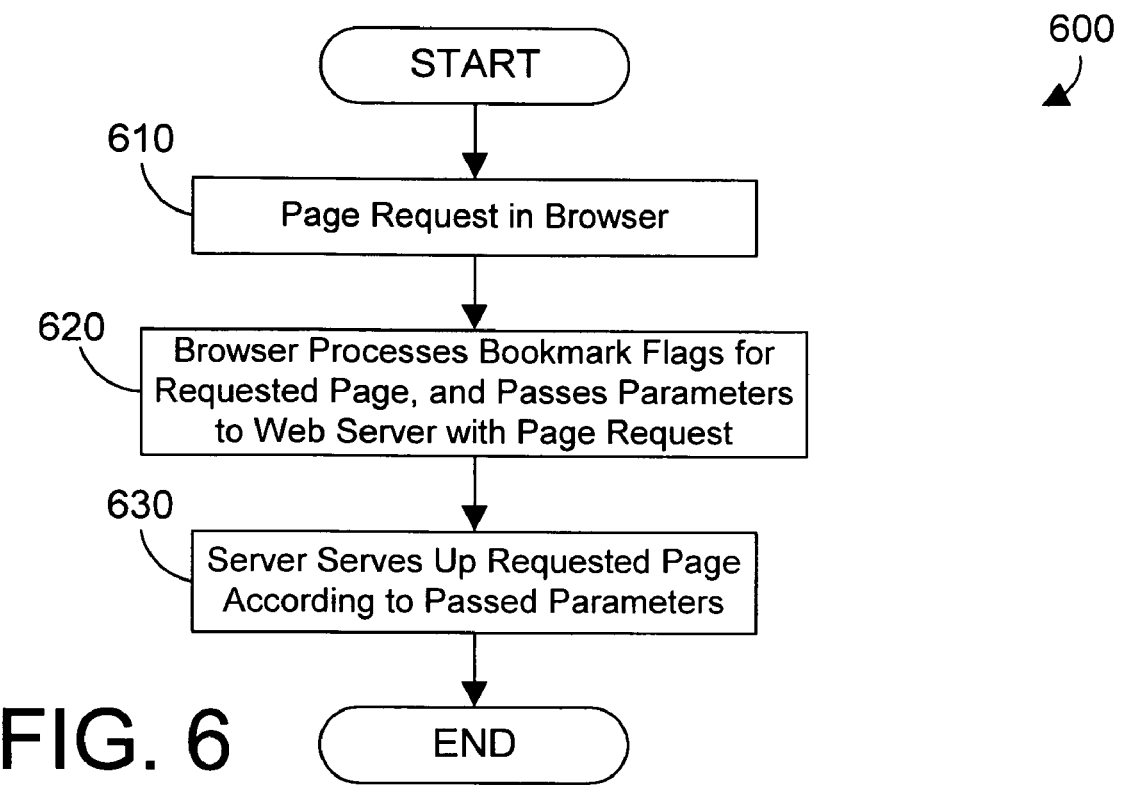
FIG. 6 is a flow diagram of a method for processing bookmark flags to render a requested web page according to the information in the bookmark flags in accordance with the preferred embodiments.

Referring now to FIG. 6, a method 600 illustrates one way for bookmark information to be used in accordance with the preferred embodiments. Method 600 begins when the browser has a need for a web page (step 610). Before requesting the web page, the browser first processes bookmark flags, if any, that correspond to the requested web page, and passes status information corresponding to these bookmark flags with the web page request (step 620). When the web server gets the request, it can then determine from the status information whether any of the bookmark flags are set, and can then serve up the page differently if the page is bookmarked (step 630). Method 600 thus illustrates how a browser can vary a request for a web page based on bookmark information, which allows the server to serve up the page differently if the page is bookmarked. One suitable way for the web browser to include bookmark information in a web page request is to append a variable name and value to the request. For example, if the request is for IBM Corporation's home page at www.ibm.com, the browser could first determine whether or not this web page is bookmarked, and if it is, it could send the request www.ibm.com&onLoadFromBookmark=1, which would tell the server that this page was being loaded from a bookmark. In similar fashion, flags corresponding to other bookmark events, such as those listed in FIG. 5, could also be sent to the server. Method 600 thus allows a server to serve up a web page differently based on the status information passed in the bookmark flags or variables.

Figure 7:
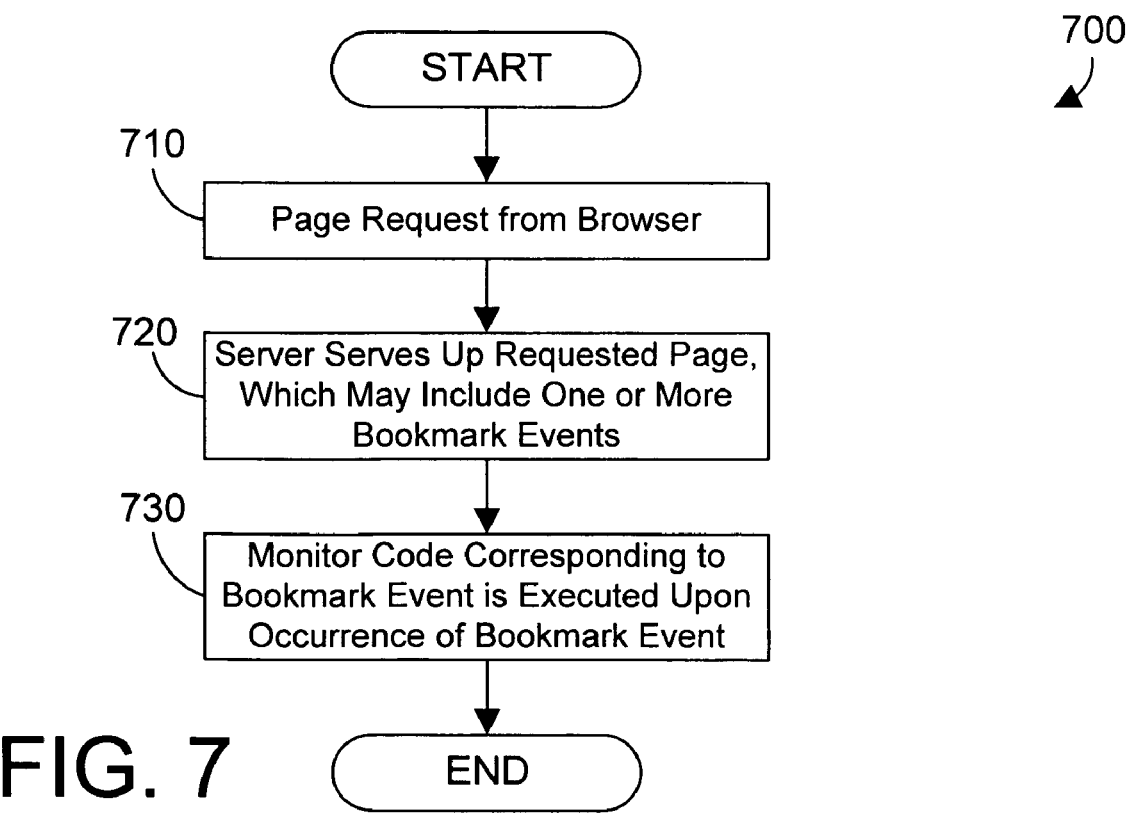
FIG. 7 is a flow diagram of a method for processing bookmark events that are included in a currently-displayed HTML page in accordance with the preferred embodiments.

Another method for using bookmark information in accordance with the preferred embodiments is method 700 shown in FIG. 7. Method 700 begins with a browser requesting a page (step 710). The server serves up the requested page, which may trigger one or more bookmark events (step 720). In the preferred embodiments, the code for these events preferably resides within the invoked page. When any bookmark event occurs, the monitor code corresponding to the bookmark event is executed (step 730). In the example in FIG. 4, we assume that this web page corresponds to the IBM home page at www.ibm.com. For the method 700 of FIG. 7, the web browser requests this page (step 710), which is sent to the web browser by the web server (step 720). Now we assume that the user bookmarks this page, which causes the onBookmark event to occur. The JavaScript in the web page for the onBookmark event is executed (step 730), which causes a special promotional window at www.ibm.com/promotions/promo.html to be displayed because of the occurrence of the onBookmark event. In this manner appropriate actions can be taken when a bookmark event occurs after the page is loaded and is being viewed by the user.

Figure 8:
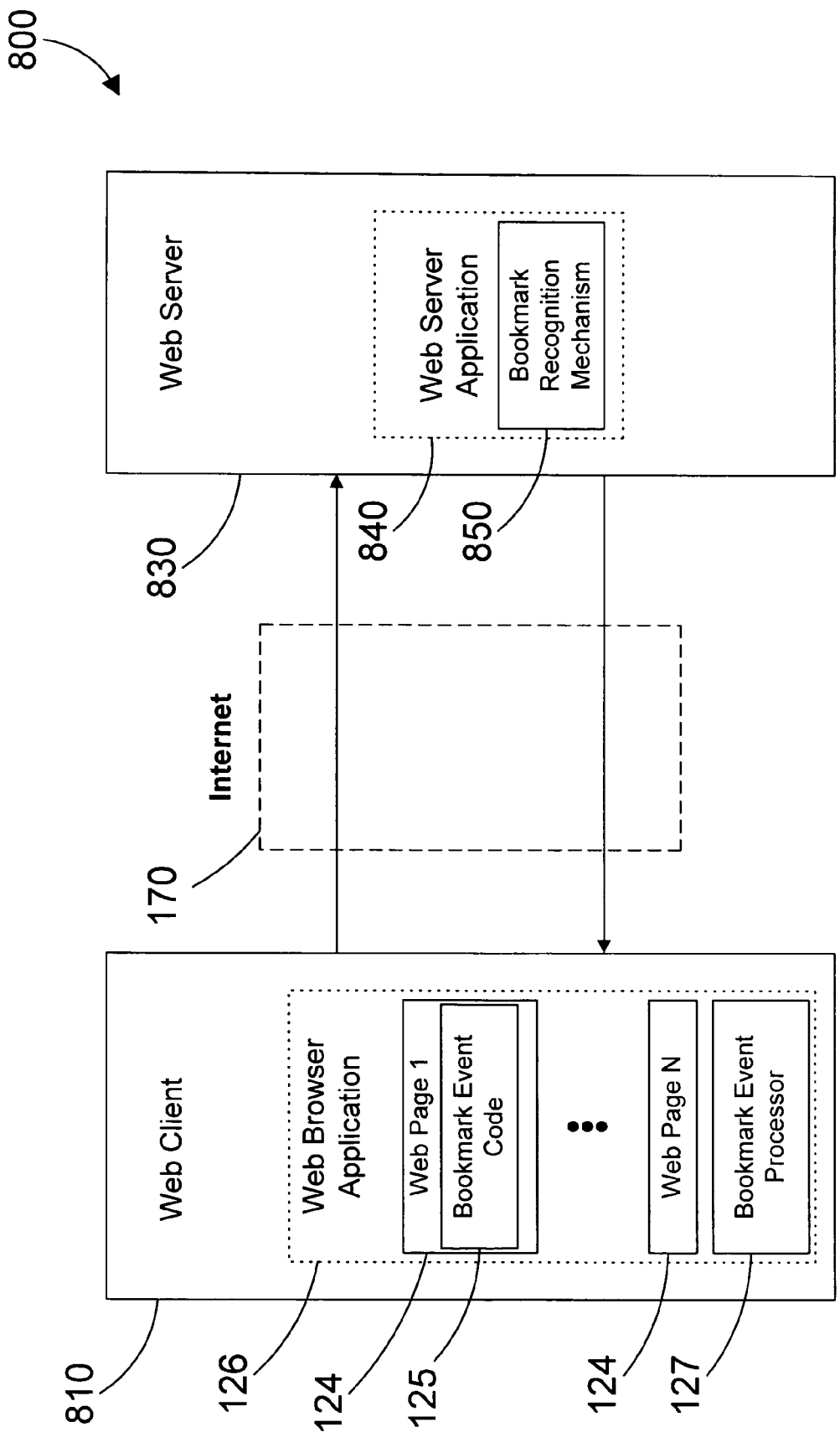
FIG. 8 is a block diagram of a sample Internet client-server configuration in accordance with the preferred embodiments.

Referring now to FIG. 8, a system 800 in accordance with the preferred embodiments includes web client computer system 810 running a web browser application 126 that communicates with a web server application 840 running on a web server computer system 830 via the Internet 170. The web browser application can display one or more web pages 124, each of which may include code to process one or more bookmark events 125. In addition, web browser 126 includes bookmark event processor 127 for processing bookmark flags as described in method 600 of FIG. 6 and for executing the bookmark event code 125 upon the occurrence of a bookmark event, as described in method 700 of FIG. 7. Web server application 840 suitably includes a bookmark recognition mechanism 850 that is invoked by the web browser application 126 upon the occurrence of a bookmark event. Bookmark recognition mechanism 850 can comprise a URL (such as the promotional URL specified in FIG. 4), a cgi-bin file, or any other way to communicate to the web server application 840 that a bookmark event has occurred in the web browser application 126. For the discussion herein, a communication from the web browser application 126 to the web server application 840 that indicates the occurrence of a bookmark event is generically referred to as a "message".

Figure 9:
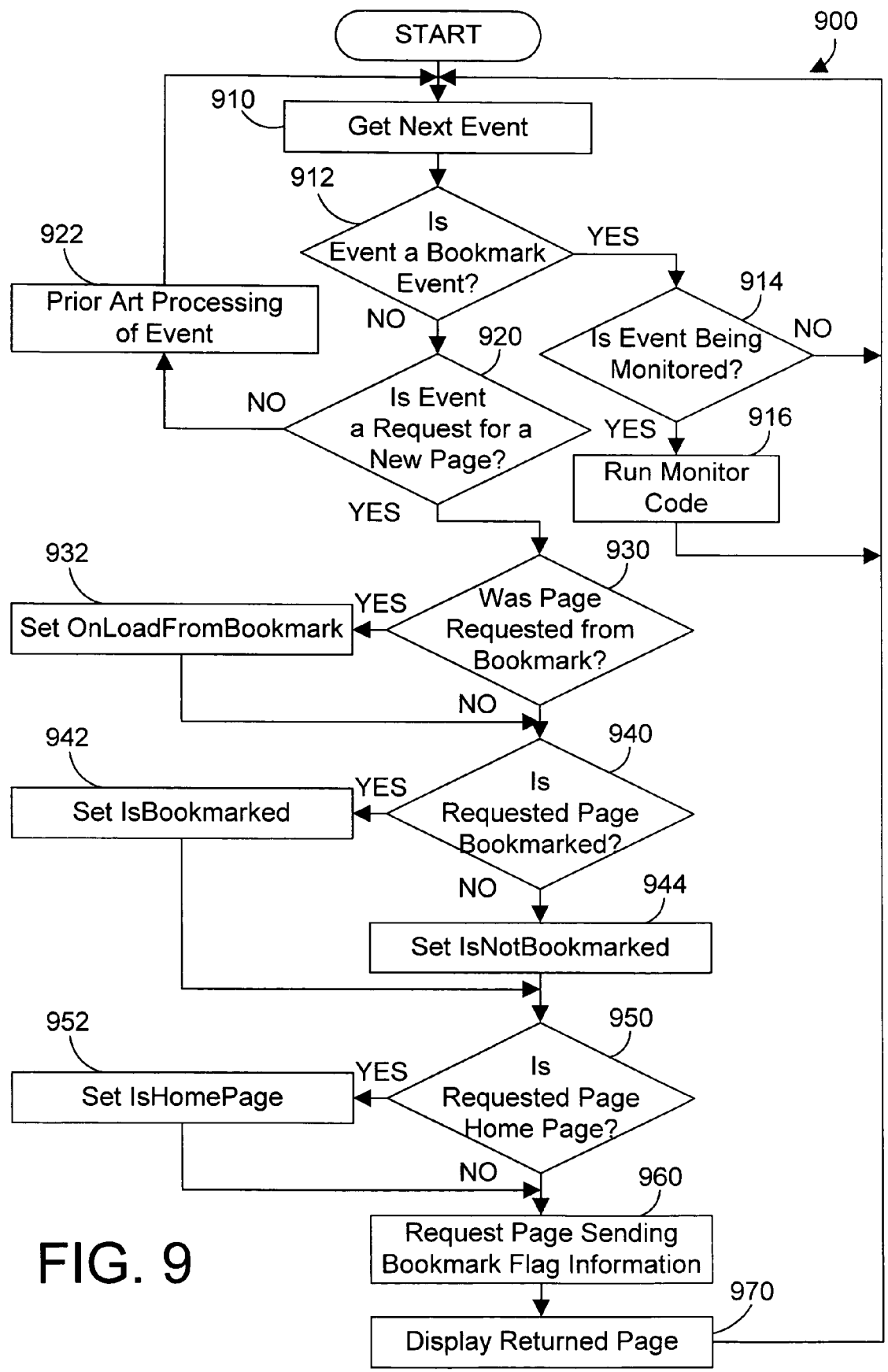
FIG. 9 is a flow diagram of a method for processing bookmark events and setting bookmark flags on the web client in FIG. 8 in accordance with the preferred embodiments.

Referring now to FIG. 9, a method 900 represents steps performed by the web browser application 126 of FIGS. 1 and 8 in accordance with the preferred embodiments. Method 900 combines some of the features of method 600 of FIG. 6 and method 700 of FIG. 7 to benefit from the advantages of both. Method 900 assumes that web browser 126 operates on "events", so the first step is to get the next event to process (step 910). If the event was a bookmark event (step 912=YES), and if the event has code within the web page to run when the event occurs (step 914=YES), the code within the web page for that event is executed (step 916). If the event is not a bookmark event (step 912=NO) and if the event is not a request for a new page (step 920=NO), the event is a prior art event, so method 900 processes the event according to prior art techniques (step 922). If the event is a request for a new page (step 920), method 900 next determines whether the page was requested from a bookmark (step 930), and if so (step 930=YES), method 900 sets the onLoadFromBookmark flag (step 932). If the page was not requested from a bookmark (step 930=NO), but the requested page is bookmarked (step 940=YES), method 900 sets the isBookmarked flag for the page (step 942). If the requested page is not bookmarked (step 940=NO), method 900 sets the isNotBookmarked flag (step 944). If the requested page is the home page for the web browser (step 950=YES), method 900 sets the isHomePage flag (step 952). Once the appropriate flags have been set in steps 930–952, the request for the web page is sent, along with the bookmark flag information. As described above, the status information relating to the bookmark flags can be added to the web page request by simply adding an ampersand followed by the name of the bookmark flag and its value. At this point the appropriate web server processes the request, and returns a web page, which is then displayed by the web browser (step 970). Note that the server, in processing the request, can vary the format and content of the returned web page according to the status information relating to the bookmark flags, as discussed in more detail below with reference to method 1000 of FIG. 10.

Figure 10:
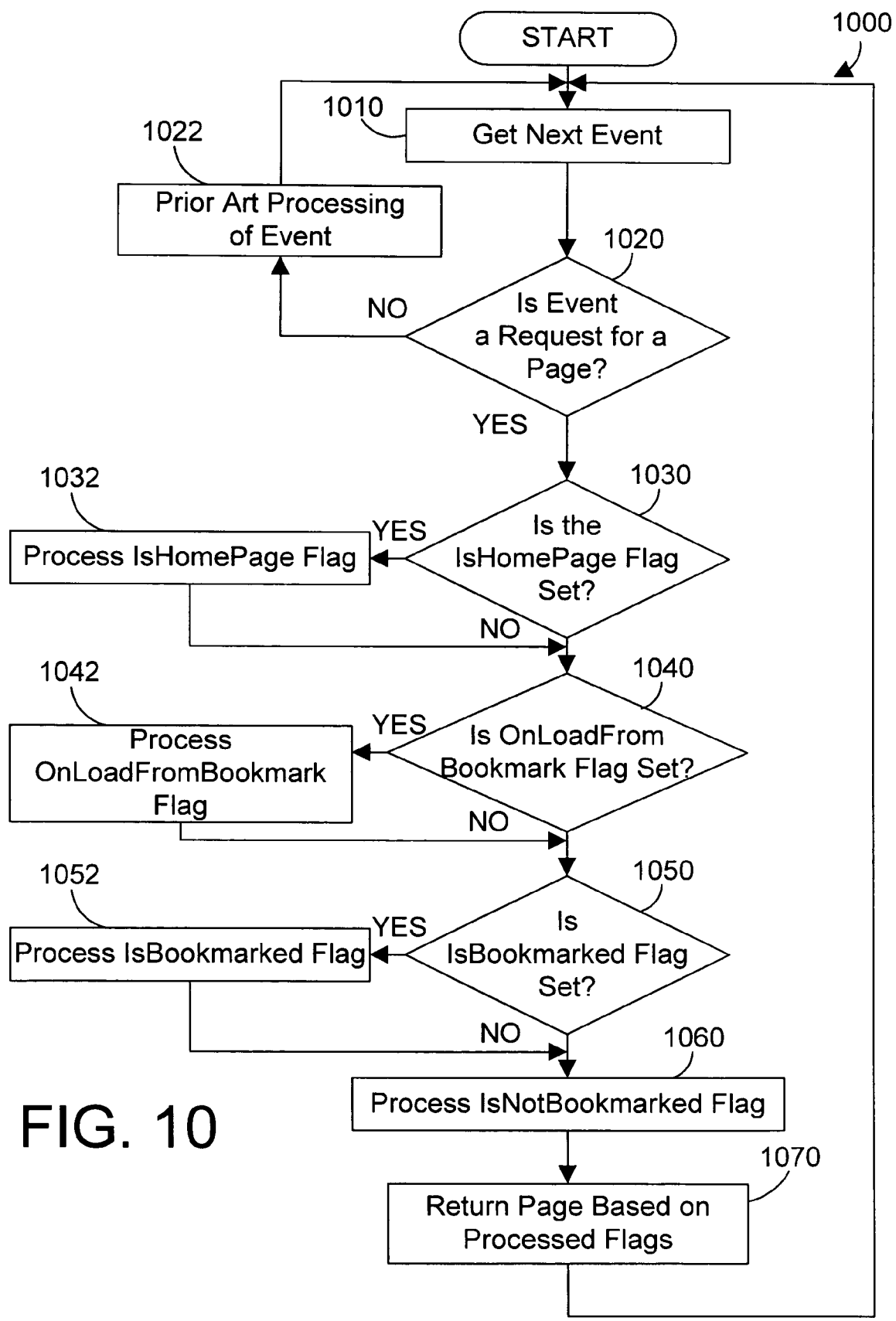
FIG. 10 is a flow diagram of a method for processing bookmark flags and rendering a web page on the web server in FIG. 8 in accordance with the preferred embodiments.

Referring to FIG. 10, a method 1000 illustrates steps performed by the web server application 840 of FIG. 8 in accordance with the preferred embodiments. We assume that web server application 840 also processes "events", and method 1000 thus begins with getting the next event (step 1010). If the event is not a request for a web page (step 1020=NO), the event is a prior art event, and is therefore processed using prior art techniques (step 1022). If, however, the event is a request for a page (step 1020=YES), method 1000 determines whether there are any bookmark flags that accompany the request. If the isHomePage flag is set (step 1030=YES), the isHomePage flag is processed (step 1032). If the onLoadFromBookmark flag is set (step 1040), this flag is processed (step 1042). If the isBookmarked flag is set (step 1050), this flag is processed (step 1052). If the isBookmarked flag is not set (step 1050=NO), this flag is processed (step 1060). The page is then returned to the requesting web browser according to the processed flags (step 1070). Note that "processing" a flag simply means performing any appropriate action based on the information in the flag. In the preferred embodiments, web server application 840 can alter the content and format of the rendered web page based on the status information in the bookmark flags that are passed with the page request.

The present invention described above with reference to the preferred embodiments provides an apparatus and method for performing some predefined function or task upon the occurrence of a bookmark event, and for sending bookmark status information to a web server when requesting a web page so the web server can alter the information presented on the web page according to the status information.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a web browser application residing in the memory and executed by the at least one processor, wherein the web browser, before requesting a current web page from a web server, processes at least one bookmark flag corresponding to the current web page, the web browser submitting a request to the web server that includes status information relating to the at least one bookmark flag, wherein the status information indicates to the web server how to serve the current web page to the web browser.

2. The apparatus of claim 1 wherein the web browser comprises a bookmark event processor that automatically performs at least one predefined function when a bookmark mechanism in the web browser is used to mark the current web page.

3. The apparatus of claim 2 wherein the at least one predefined function comprises sending a message to a web server that sent the current web page to the web browser.

4. The apparatus of claim 2 wherein the current web page comprises code that is executed by the bookmark event processor to perform the at least one predefined function.

5. The apparatus of claim 4 wherein the code comprises Java script.

6. The apparatus of claim 1 wherein the at least one bookmark flag comprises a flag that indicates whether the current web page is bookmarked, a flag that indicates whether the current web page was loaded from a bookmark, and a flag that indicates whether the current web page is a home page for the web browser.

7. The apparatus of claim 1 wherein the web server determines which components to add to the current web page based on the status information.

8. An apparatus comprising:
at least one processor;
a memory coupled to the at least one processor;
a current web page residing in the memory, the current web page including code that performs at least one predefined function upon the occurrence of a bookmark event;
a web browser application residing in the memory and executed by the at least one processor, wherein the web browser, before requesting the current web page from a web server, processes at least one bookmark flag for the current web page and submits a request to the web server that includes status information relating to the at least one bookmark flag, the web server using the status information to determine which components to add to the current web page when serving the current web page to the web browser;
the web browser displaying the current web page, the web browser including a bookmark event processor that executes the code when a bookmark mechanism in the web browser is used to mark the current web page, thereby sending at least one message to the web server that sent the current web page to the web browser.

9. A method for accessing a current web page, the method comprising the steps of:
using a web browser to request the current web page;
before the web browser requests the current web page from a web server, the web browser processing at least one bookmark flag corresponding to the current web page, the web browser submitting a request to the web server that includes status information relating to the at least one bookmark flag, wherein the status information indicates to the web server how to serve the current web page to the web browser.

10. The method of claim 9 further comprising the steps of:
displaying the current web page in a web browser;
a user bookmarking the current web page in the web browser; and
in response to the bookmarking of the current web page, the web browser automatically performing at least one predefined function.

11. The method of claim 10 wherein the step of performing the at least one predefined function comprises the step of executing code in the current web page.

12. The method of claim 10 wherein the step of performing the at least one predefined function comprises the step of sending a message to a web server that sent the current web page to the web browser.

13. The method of claim 9 further comprising the step of the web server determining which components to add to the current web page based on the status information.

14. A method for performing at least one predefined function when a current web page is bookmarked, the method comprising the steps of:
processing at least one bookmark flag for the current web page;
submitting a request to a web server that includes status information relating to the at least one bookmark flag;
the web server using the status information to determine which components to add to the current web page;
the web server serving the current web page to the web browser;
the web browser displaying the current web page;
a user bookmarking the current web page in the web browser; and
in response to the bookmarking of the current web page, the web browser automatically sending a message to the web server.

15. A computer-readable program product comprising:
(1) a web browser application that processes a request for a current web page, wherein the web browser, before requesting the current web page from a web server, processes at least one bookmark flag corresponding to the current web page, the web browser submitting a request to the web server that includes status information relating to the at least one bookmark flag, wherein the status information indicates to the web server how to serve the current web page to the web browser; and
(2) recordable signal bearing media bearing the web browser application.

16. The program product of claim 15 wherein the web browser includes a bookmark event processor that automatically performs at least one predefined function when a bookmark mechanism in the web browser is used to mark a current web page.

17. The program product of claim 16 wherein the at least one predefined function comprises sending a message to a web server that sent the current web page to the web browser.

18. The program product of claim 16 wherein the current web page comprises code that is executed by the bookmark event processor to perform the at least one predefined function.

19. The program product of claim 15 wherein the web server determines which components to add to the current web page based on the status information.

20. The program product of claim 15 wherein the at least one bookmark flag comprises a flag that indicates whether the current web page is bookmarked, a flag that indicates whether the current web page was loaded from a bookmark, and a flag that indicates whether the current web page is a home page for the web browser.

21. A computer-readable program product comprising:
(1) a web browser application comprising:
(1A) a mechanism that processes at least one bookmark flag for a current web page and submits a request to a web server that includes status information relating to the at least one bookmark flag, wherein the status information indicates to the web server how to serve the current web page to the web browser;

(1B) a mechanism that displays the current web page;

(1C) a bookmark mechanism in the web browser that is used to mark the current web page;

(1D) a bookmark event processor that executes code that sends at least one message to a web server that sent the current web page to the web browser when the bookmark mechanism in the web browser marks the current web page; and (2) recordable signal bearing media bearing the web browser application.

22. An apparatus comprising:

at least one processor;

a memory coupled to the at least one processor;

a web server application residing in the memory and executed by the at least one processor, the web server application including a bookmark recognition mechanism that receives bookmark status information corresponding to the current web page from the web browser, wherein the web server application determines which components to add to the current web page based on the bookmark status information.

23. A computer-implemented method for serving a current web page requested by a web browser, the method comprising the steps of:

receiving from a web browser bookmark status information corresponding to the current web page;

determining which components to add to the current web page based on the bookmark status information; and serving the current web page to the web browser.

24. A program product comprising:

(1) a web server application that receives bookmark status information corresponding to a current web page from a web browser, wherein the web server application determines which components to add to the current web page based on the bookmark status information; and (2) recordable signal bearing media bearing the web server application.

* * * * *